(12) United States Patent
Xykis et al.

(10) Patent No.: US 9,145,054 B1
(45) Date of Patent: Sep. 29, 2015

(54) MODULAR POWER TAKE-OFF ASSEMBLY

(71) Applicant: Power Solutions International, Inc., Wood Dale, IL (US)

(72) Inventors: Constantine Xykis, Hartland, WI (US); Brian Manning, Elk Grove, IL (US); Patrick Stockwell, Wood Dale, IL (US); Andrew Backus, Wood Dale, IL (US); Gary Winemaster, Wood Dale, IL (US)

(73) Assignee: Power Solutions International, Inc., Wood Dale, IL (US)

( * ) Notice: Subject to any disclaimer, the term of this patent is extended or adjusted under 35 U.S.C. 154(b) by 0 days.

(21) Appl. No.: 14/606,491

(22) Filed: Jan. 27, 2015

Related U.S. Application Data

(60) Provisional application No. 62/066,355, filed on Oct. 20, 2014.

(51) Int. Cl.
| | | |
|---|---|---|
| B60K 25/02 | (2006.01) | |
| B60K 17/28 | (2006.01) | |
| B60K 25/06 | (2006.01) | |

(52) U.S. Cl.
CPC ............... *B60K 25/02* (2013.01); *B60K 17/28* (2013.01); *B60K 25/06* (2013.01); *B60K 2025/022* (2013.01)

(58) Field of Classification Search
CPC .. B60K 25/02; B60K 25/06; B60K 2025/022; B60K 17/28
See application file for complete search history.

(56) References Cited

U.S. PATENT DOCUMENTS

| | | | |
|---|---|---|---|
| 3,483,763 A | 12/1969 | Enters | |
| RE27,177 E | 9/1971 | Schlapman et al. | |
| 4,036,029 A | 7/1977 | Francis | |
| 4,763,744 A | 8/1988 | McVicar et al. | |
| 5,040,615 A | 8/1991 | Fletcher | |
| 5,346,018 A | 9/1994 | Koster | |
| 6,773,315 B2 * | 8/2004 | Roycroft et al. | ........... 440/12.51 |
| 7,004,864 B2 | 2/2006 | Hotta | |
| 2014/0196551 A1 | 7/2014 | Leggott et al. | |

FOREIGN PATENT DOCUMENTS

| | | |
|---|---|---|
| EP | 0 709 560 | 5/1996 |
| JP | S262 60931 | 3/1987 |
| JP | H 10 141079 | 5/1998 |

OTHER PUBLICATIONS

Images of Nissan fuel-injected K21s engine.

* cited by examiner

*Primary Examiner* — Faye M Fleming
(74) *Attorney, Agent, or Firm* — McDonnell Boehnen Hulbert & Berghoff LLP

(57) ABSTRACT

A modular PTO assembly and an engine system comprising a modular PTO assembly are disclosed. The modular PTO assembly is configured to be mounted and secured to a crankcase of an engine, and includes a front cover positioned on a base plate so as to define a housing. The modular PTO assembly also comprises a power input sprocket mechanically coupled to a power output sprocket via a chain. The power input sprocket is coupled to a nose of a crankshaft and is configured to rotate at an approximately same speed as the crankshaft. The power output sprocket is configured to be coupled to a shaft of an auxiliary component and to rotate at an approximately same speed as the shaft, thereby transferring power from the engine to the auxiliary component.

18 Claims, 4 Drawing Sheets

MODULAR POWER TAKE-OFF ASSEMBLY

CROSS-REFERENCE TO RELATED APPLICATION

Priority is claimed to U.S. Provisional Patent Application No. 62/066,355 filed on Oct. 20, 2014, the contents of which are hereby incorporated by reference.

BACKGROUND

Unless otherwise indicated herein, the description provided in this section is not prior art to the claims and is not admitted to be prior art by inclusion in this section.

Motor-driven vehicles generally include an engine with a transmission for driving the wheels of the engine. The engine typically transfers power to the transmission via a flywheel attached to one end of a crankshaft, with the flywheel being coupled to a torque converter of the transmission. By convention, the side of the engine at which the crankshaft couples to the transmission is referred to as the rear side or rear end of the engine.

Often, the engine has a significant excess of power available to drive auxiliary systems that are required to perform the vehicle's intended services. A power take-off (PTO) system typically delivers torque from the engine to an auxiliary system component by using the rotation of the crankshaft to rotate a shaft of a component of the auxiliary system, such as a pump or a generator. A PTO system can receive power from the engine in any one of several ways. By way of example, a PTO system could be driven directly by the crankshaft, by a separate shaft coupled to the crankshaft or the transmission, or by gears within the transmission. In any one of these examples, the PTO system could be gear-driven, chain-driven, or belt-driven.

A PTO system can be connected or coupled to the engine in one of several ways. A "rear-drive PTO system" may act as a load driven by the crankshaft via the flywheel, either by a direct connection to the flywheel or by an indirect connection (e.g., via the transmission). Because high-power PTO systems are typically bulky, implementing such a rear-drive PTO system is not always practical. For instance, an engine compartment may not be sufficiently large enough to accommodate a rear-drive PTO system. The gearing of a vehicle's transmission may also make it impractical to use the transmission to drive the rear-drive PTO system, as the transmission may not be able to deliver the requisite torque to both the wheels and the PTO system.

Another type of PTO system is a front-drive PTO system, which may be mounted to the front end of the engine and coupled to the crankshaft at the nose of the crankshaft. By convention, the nose of the crankshaft is the end of the crankshaft opposite the end of the crankshaft at which the flywheel is attached. Such a system may also be bulky, however, and is typically an integral part of the engine's crankcase. One disadvantage of integral PTO system is that performing maintenance on the PTO system requires taking the vehicle out of service, sometimes for an extended period of time. At a minimum, the engine oil must be drained prior to doing any type of maintenance on the PTO system, and the engine, and likely the vehicle, will remain out of service until the PTO system is able to be restored.

Further, to provide lubrication for PTO system components, a front-drive PTO system is usually connected to the engine's oil sump. There is thus a possibility that combustion debris can enter the PTO system's oil bath, thereby fouling PTO system components and possibly shortening the service life of such components. In the same vein, wear products from both systems can enter the oil sump, which may also degrade the performance and the service life of PTO system components as well as engine components.

SUMMARY

The present disclosure is directed to a front-drive, modular PTO assembly. The modular PTO assembly may be mounted to the crankcase of the engine and coupled to a nose of a crankshaft, thereby allowing for a compact design. Additionally, the modular PTO assembly may be easily removed from the engine for maintenance and may be replaced by another modular PTO assembly, thereby minimizing the time the motor vehicle is out of service.

The modular PTO assembly may also include a separate housing for a majority of components of the modular PTO assembly, thereby providing an isolated volume for a lubrication bath that is separate and isolated from the crankcase and the engine's oil sump. The use of a separate lubrication bath may significantly reduce the amount of cross-contamination between the engine and the modular PTO assembly, thereby extending the service life of both engine component and modular PTO assembly components.

Accordingly, in one aspect, a modular PTO assembly is disclosed. The modular PTO assembly is configured to be mounted and secured to a crankcase of an engine, and includes a front cover positioned on a base plate so as to define a housing that is isolated from the crankcase. The modular PTO assembly also includes a power input sprocket, a power output sprocket, and a chain, each of which is located within the housing. The power input sprocket is configured to be coupled to a nose of a crankshaft through a first bore in the housing, while the power output sprocket is configured to be coupled to a shaft of an auxiliary component through a second bore in the housing. The power input sprocket is thus configured to rotate at an approximately same speed as the crankshaft, whereas the power output sprocket is configured to rotate at an approximately same speed as the shaft of the auxiliary component. Further, the chain mechanically couples the power input sprocket to the power output sprocket.

In another aspect, an engine system comprising an engine and a modular PTO assembly is disclosed. The engine comprises a crankcase, a crankshaft, and a timing sprocket, with the timing sprocket being mounted on a nose of the crankshaft. The modular PTO assembly is mounted to the forward end of the engine and comprises a front cover positioned on a base plate so as to define a housing that is isolated from the crankcase. The modular PTO assembly also includes a power input sprocket, a power output sprocket, and a chain, each of which is located in the housing. The power input sprocket is coupled to the timing sprocket through a first bore in the housing and is configured to rotate at an approximately same speed as the timing sprocket. The power output sprocket is configured to be coupled to a shaft of an auxiliary component through a second bore in the housing and is configured to rotate at an approximately same speed as the shaft of the auxiliary component. The chain mechanically couples the power input sprocket to the power output sprocket.

These as well as other aspects and advantages will become apparent to those of ordinary skill in the art by reading the following detailed description, with reference where appropriate to the accompanying drawings. Further, this summary is merely an example and is not intended to limit the scope of the invention as claimed.

DETAILED DESCRIPTION

The following detailed description describes various features, functions, and attributes of the disclosed systems, methods, and devices with reference to the accompanying figures. In the figures, similar symbols typically identify similar components, unless context dictates otherwise. The illustrative embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Figure 1:
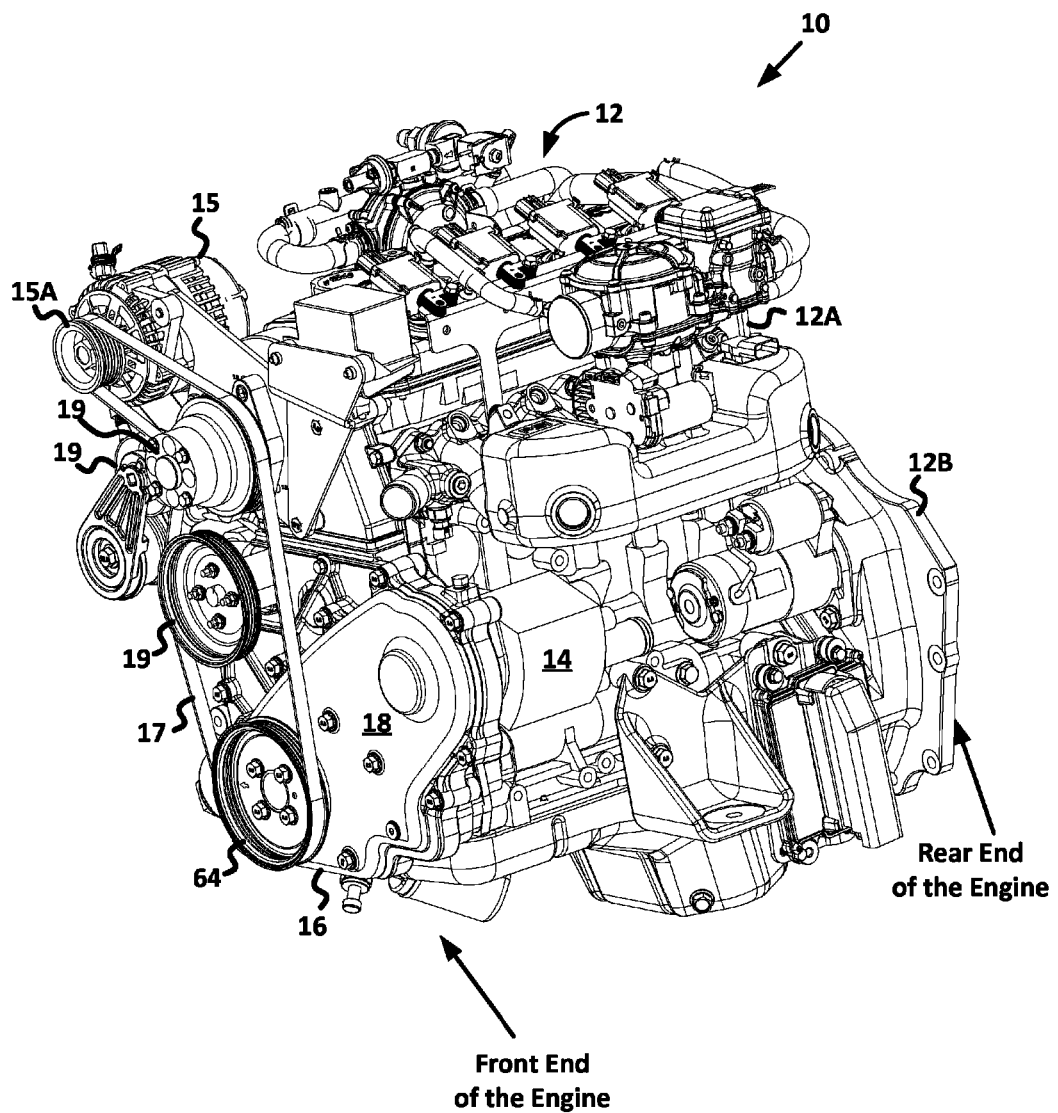
FIG. 1 is a perspective view an example engine system in which features of the present disclosure can be implemented.

FIG. 1 illustrates an example engine system 10 that includes an engine 12, an auxiliary component 14, and a modular PTO assembly 16. In the illustrated example, the engine system 10 is configured for use in an industrial motor vehicle, such as a forklift. However, the engine system 10 could be an engine adapted for use in another type of vehicle, such as a different industrial, agricultural, or construction vehicle.

The engine 12 is illustrated as an internal combustion engine. As such, the engine 12 includes a cylinder head 12A and a crankcase 12B, which may collectively be referred to as a long block. The cylinder head 12A comprises a plurality of well-known internal components that are not shown in FIG. 1, such as camshaft(s), valves, spark plugs, valve springs, bearings, etc. The crankcase 12B also includes well-known internal components not shown in FIG. 1, such as a crankshaft, pistons, connecting rods, bearings, a timing sprocket, etc. A transmission (not shown) may also be bolted to the rear end of the crankcase 12B.

Alternatively, the engine 12 could be implemented a different type of engine, such as an electric motor. In this case, the engine 12 may include a single case in lieu of the cylinder head 12A and the crankcase 12B.

The auxiliary component 14 drives an auxiliary system (not shown) of the motor vehicle. As one such example, the auxiliary component 14 may be a hydraulic pump configured to pump hydraulic fluid in order to provide a particular pressure or range of pressures for a hydraulic system. In other examples, the auxiliary component 14 may drive a different system and could be device other than a pump, such as a generator or a piece of industrial, agriculture, or construction machinery, for instance.

The modular PTO assembly 16 is mounted to a front end of the engine 12 and is coupled to the crankshaft of the engine 12 and to a shaft of the auxiliary component 14. During operation, power generated by the engine 12 is transferred to a shaft (not shown) of the auxiliary component 14 via the modular PTO assembly 16. Advantageously, mounting the modular PTO assembly 16 to the front end of the engine 12 may reduce the amount of space the modular PTO assembly 16 occupies in an engine compartment of the vehicle. As such, the modular PTO assembly 16 can be utilized in relatively small engine compartments, such as the engine compartment for a forklift, or in engine compartments in which the space available for the modular PTO assembly 16 is otherwise limited.

Figure 2:
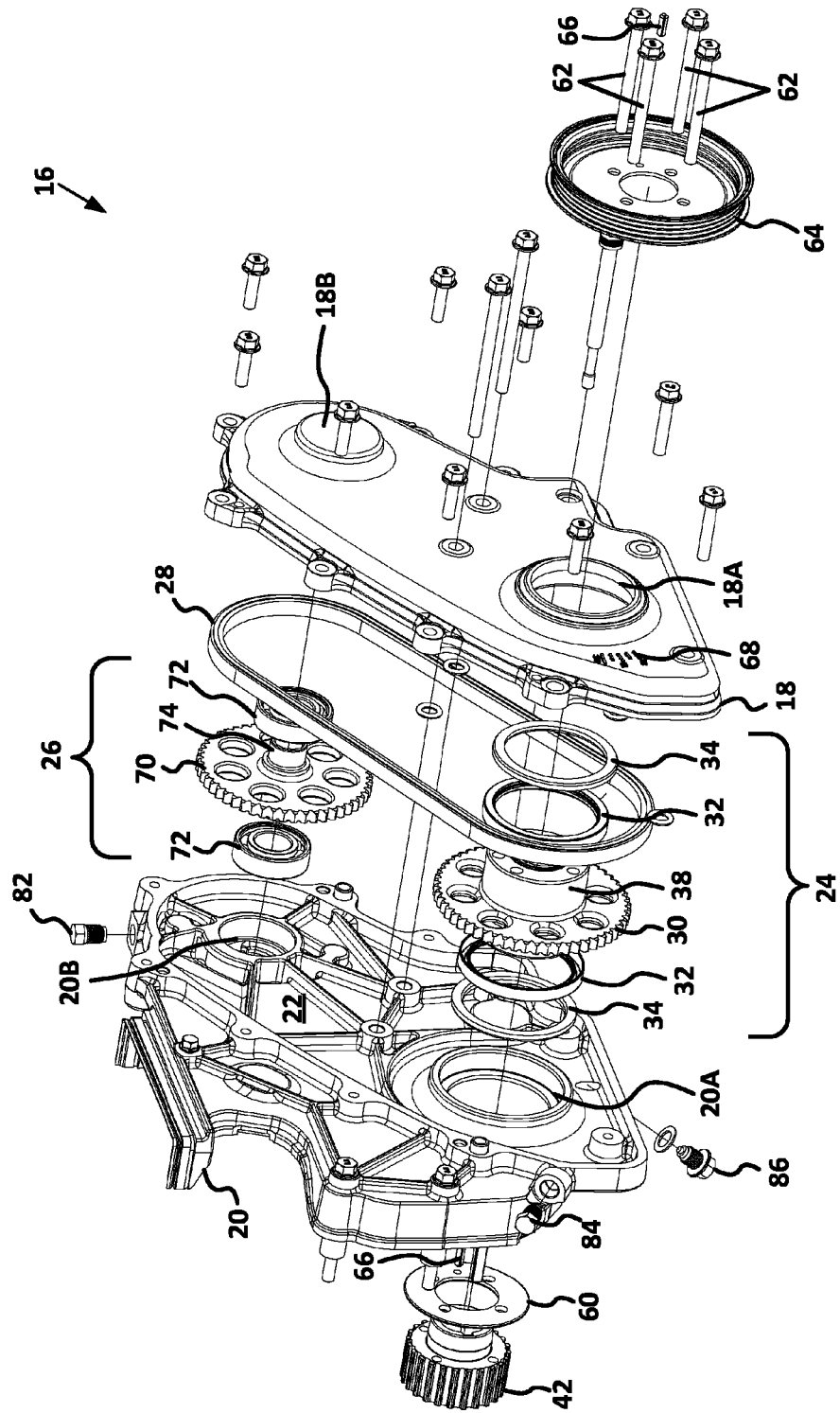
FIG. 2 illustrates components of the example modular PTO illustrated in FIG. 1.

FIG. 2 shows an exploded view of the components of the modular PTO assembly 16. A front cover or cover 18 and a base plate 20 form a housing 22, which is separated and isolated from the cylinder head 12A and the crankcase 12B of the engine 12. Within the housing 22 are an input power subassembly 24, an output power subassembly 26, and a chain 28. A first bore 20A, a second bore 20B, and a third bore 18A through the housing 22 allow for the components of the modular PTO assembly 16 to be connected to components of the engine 12 or the auxiliary component 14.

The input power subassembly 24 includes an input power sprocket 30, seals 32, and mounting rings 34. A hub 38 extends out from both sides of the input power sprocket 30, and one seal 32 and one mounting ring 34 are each placed on or around the hub 38 on each side the input power sprocket 30, thereby individually and collectively providing a seal or a fluid barrier between the housing 22 and the crankcase 12B and between the housing 22 and the engine compartment. Preferably, though not necessarily, the input power sprocket 30 and the hub 38 are one integral component.

The mounting rings 34 may also align the input power sprocket 30 in the first bore 20A and through the third bore 18A such that the input power sprocket 30 is substantially centered in the first bore 20A and the third bore 18A. Advantageously, using the mounting rings 34 to substantially center the input power sprocket 30 in the bores 18A, 20A eliminates the need to use traditional doweling techniques when mounting the modular PTO assembly 16 to the engine 12, thereby allowing for faster, more efficient installation and removal. Preferably, the mounting rings 34 are made of a low-friction plastic, such as Teflon®, though other low-friction materials could also be used.

Figure 3:
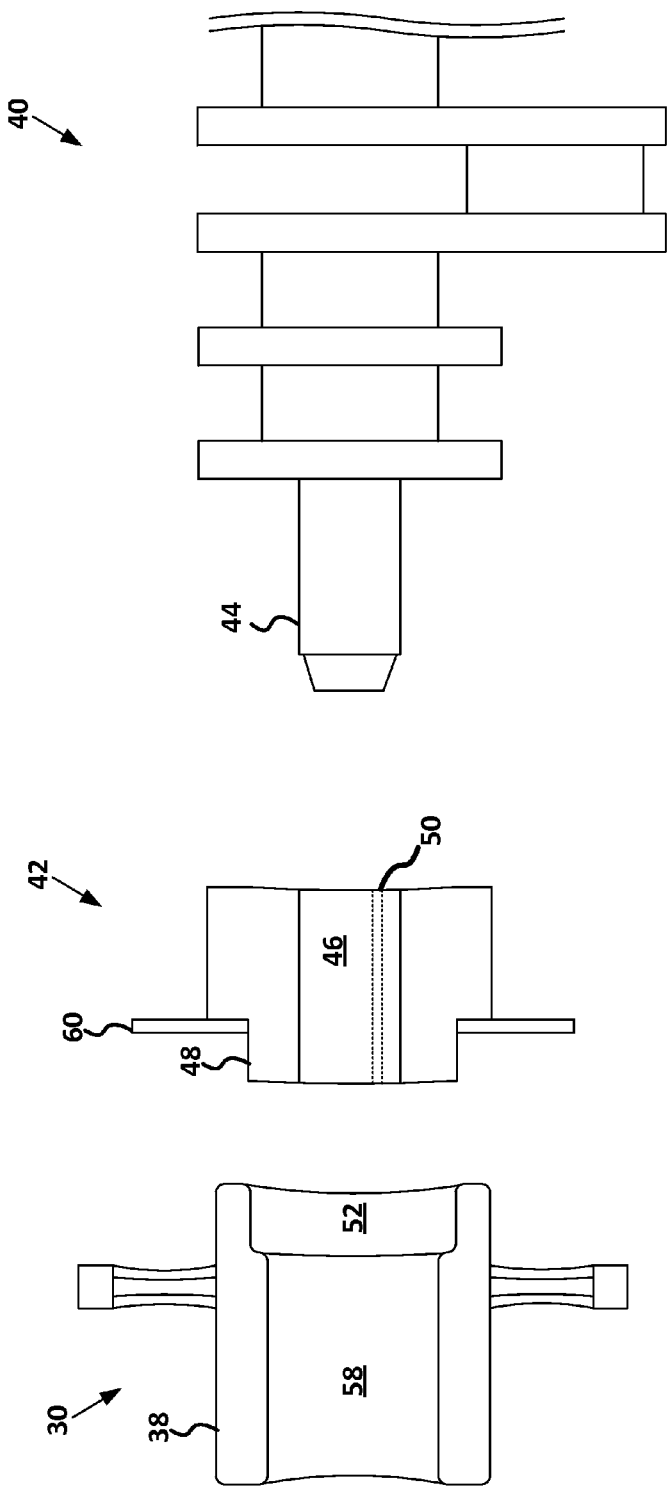
FIG. 3 is cross-section of example components that may be included in the engine system illustrated in FIG. 1.

In order to receive torque from the engine 12, the power input sprocket 30 is coupled to a timing sprocket of the engine 12. FIG. 3 shows a cross-section of the power input sprocket 30 as well as a crankshaft 40 and a timing sprocket 42. Note that, for illustrative purposes, only a portion of the crankshaft 40 is shown. Further, components such as bearing and connecting rods are also not shown in FIG. 3.

A diameter of a bore 46 through the timing sprocket 42 is sufficiently large enough to interference fit or slip fit the timing sprocket 42 onto the nose 44. The bore 46 may include a keyway 50 in the aperture 46 may be also configured to receive a key on the nose 44, such as a Woodruff key, may cause the crankshaft 40 to rotate the timing sprocket 42 during operation.

A diameter of a first bore 52 through a central portion of the hub 38 is, in turn, sufficiently large enough to interference fit or slip fit the input power sprocket 30 onto a hub 48 of the timing sprocket 42. A second bore 58, which has a smaller diameter than the first bore 52, may extend through the remainder of the central portion of the hub 38. The diameter of the second bore 56 may be sufficiently large enough to receive a socket used to tighten or loosen a crankshaft bolt (not shown) that is inserted into the nose 44, while also limiting the travel of the timing sprocket 42 during interference fitting/slip fitting.

In one example, the timing sprocket 42 is a component of the engine 12. In this case, the timing sprocket 42 may already be secured to the crankshaft 40, and the input power sprocket 30 is interference fitted/slip fitted onto the hub 48 of the timing sprocket 42 when mounting the modular PTO assembly 16 to the engine 12.

Alternatively, the timing sprocket 42 may be a component of the modular PTO assembly 16, as shown in FIG. 2. In this case, a flange 60 positioned on or around the hub 48 is also part of the modular PTO assembly 16. During manufacturing, the input power sprocket 30 may be coupled to the timing sprocket 42 via interference fitting or slipping fitting. Additionally, one or more bolts, such as bolts 62, may pass or be threaded through additional bores in the hub 38 of the input power sprocket 30, bores in the flange 60, and bores in the timing sprocket 42, thereby allowing the input power sprocket 30 to rotate at an approximately equivalent speed as the crankshaft 40 during operation. In the event that the key on the crankshaft 40 does not fill the keyway 50, a spacer 65 may be included to fill the keyway 50.

A pulley 64 may also be secured to the input power sprocket 30 via the bolts 62. The pulley 64, which is on the external side of the front cover 18, may be configured to provide power to another engine component, such as an alternator 15, as shown in FIG. 1. A belt 17 may be positioned on or around the pulley 64, an alternator pulley 15A, and one or more additional pulleys 19. Thus, the rotation of the crankshaft 40 may also provide power to an additional engine component or components, though the additional engine components represent, as a general matter, a much smaller load on the engine 12 than the auxiliary component 14.

Returning to FIG. 2, slotted pins 66 may be inserted into the pulley 64 and the flange 60, and the timing sprocket 42. The slotted pins 66 are aligned so as to provide an indication of the position of the crankshaft 40, which may be ascertained from timing marks 68 on the external side of the front cover 18.

The output power assembly 26 includes an output power sprocket 70 and two bearings 72. The bearings 72 are positioned on or around a hub 74 that extends outward from each side of the output power sprocket 70, such that there is one bearing 72 on either side of the output power sprocket 70. Like the input power sprocket 30, the output power sprocket 70 and the hub 74 are preferably, but not necessarily, one integral component. The bearings 72 fit into respective bearing pockets in the second bore 20B and a bearing pocket in the front cover 18. Although an interior view of the front cover 18 is not shown, the location of the bearing pocket in the front case is shown as an elevated portion 18B of the front cover 18. In other examples, however, the bearing pocket may be integrated into the rear case 20, while the second bore 20B is through the front cover 18. During operation, the bearings 72 support the power output sprocket 36 and resist transverse loading caused by engine torque by allowing the output sprocket to rotate.

Figure 4:
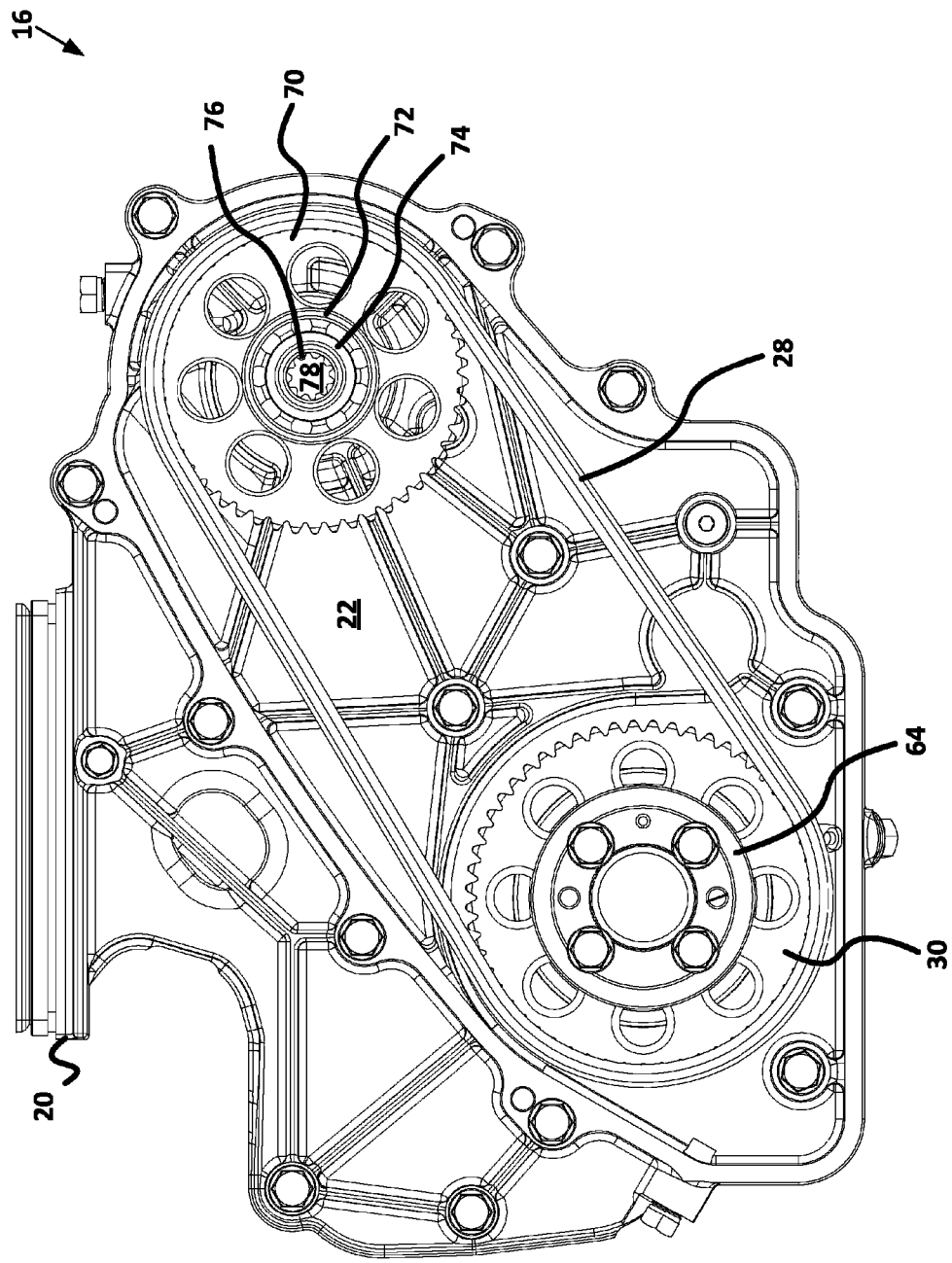
FIG. 4 illustrates a front view of the example modular PTO system depicted in FIGS. 1 and 2.

The chain 28 is placed around the teeth of the input power sprocket 30 and the output power sprocket 70, as shown in FIG. 4, which shows an assembled view of the modular PTO assembly 16, with the exception of the front cover 18. Also shown in FIG. 4, splines 76 are positioned in a portion of a bore of 78 of the hub 74, which act to engage splines on the shaft (not shown) of the auxiliary input component 14, thereby coupling the output power sprocket 70 to the shaft of the auxiliary component 14.

Returning to FIG. 2, a shoulder bolt 80 provides additional support and alignment during installation. By design, the position of the shoulder bolt 80 is configured to interface with a threaded bore in the crankcase 12B, thereby allowing installation of the modular PTO assembly 16 without the need to bore holes in the crankcase 12B. Additionally, the shoulder bolt 80 further minimizes the rotational degree of freedom of the modular PTO assembly 16 during installation. Like the mounting rings 34, the shoulder bolt 80 also permits the modular PTO assembly 16 to quickly mounted and removed from the front end of the engine 12 without resorting to traditional doweling techniques. Further, the shoulder bolt 80 at least partially secures the modular PTO assembly 16 to the crankcase 12B.

To maintain proper lubrication of the chain 28 and power sprockets 30, 70 during operation, the housing 22 may include a lubrication bath, which includes a volume of lubricant, such as engine oil, that is deposited in the housing 22. As such, the housing 22 includes a vent plug 82, a fill plug 84, and a drain plug 86. Each plug may be inserted into a port in the housing 22 that goes through the base plate 20 in the illustrated example.

In one example, the fill plug 84 and/or the drain plug 86 may be replaced or supplemented with a sensor configured to monitor conditions in the housing related to the lubrication bath. By way of the example, the sensor could be configured to measure a temperature of the lubrication bath or a level of the lubrication bath (e.g., the amount of fluid in the lubrication bath). The sensor may be configured to provide an output signal indicative of the measure temperature and/or level, which a computer of the vehicle may receive and use to provide an indication under certain conditions. For instance, the computer may be configured to provide a warning light or alarm when the temperature exceeds a threshold temperature and/or when the level drops below a threshold level.

In another example, however, the chain 28 may be replaced with a belt, such as a toothed belt. Replacing the chain 28 with a toothed belt may obviate the need for a lubrication bath, in which case the modular PTO assembly 16 may not include ports for the plugs 82, 84, and 86.

In an exemplary implementation, rotation of the crankshaft 40 causes the timing sprocket 42 and the input power sprocket 30 to rotate at approximately the same speed as the crankshaft 40. This transfers torque generated by the engine 12 to the input power sprocket 30. The chain 28 mechanically couples the input power sprocket 30 and the output power sprocket 70, which causes the output power sprocket 70 to rotate and transfers the generated torque from the input power sprocket 30 to the output power sprocket 70. The output power sprocket 70 then causes the shaft of the auxiliary component 14 to rotate, thereby transferring power from the engine 12 to the auxiliary component 14.

The amount of torque transferred to the output power sprocket 70 assembly, and thus the amount of engine power transferred to the auxiliary component 14, depends in part on the ratio in diameters of the input power sprocket 30 and the output power sprocket 70. By way of example, the ratio of the diameters may vary from 1:3 to 3:1, depending on the specific loading requirements of the auxiliary component 14. As one example, the diameters of the power sprockets 30, 70 should be chosen so as to transfer approximately 70 horsepower to the auxiliary component 14 at approximately 3000 rotations per minute of the auxiliary component's shaft. Depending on the application of the auxiliary component 14, however, the modular power sprockets 30, 70 can be configured to provide a different output power.

The modular PTO assembly 16 provides a number of advantages over rear-drive PTO systems and integral front-drive PTO systems. Unlike integral front-drive PTO assemblies, which typically receive lubricant from the engine's oil system, the modular PTO assembly 16 has a separate, self-contained lubrication bath. Thus, removing, or otherwise performing maintenance on, the modular PTO assembly 16 for maintenance does not require one to first drain the oil from the engine 12. And unlike rear-drive PTO systems, the modular PTO assembly 16 is compact and can thus be used in a wider variety of vehicles.

Further, performing maintenance on the modular PTO assembly 16 does not require the vehicle to be taken out of service. For instance, the modular PTO assembly 16 can be removed from the engine 12 and replaced with another modular PTO assembly, thereby allowing the motor vehicle to stay in service while maintenance is performed on the original modular input power assembly 16.

Moreover, the modular PTO assembly 16 may be adapted for driving different embodiments of the auxiliary component 14. For example, consider a situation in which the auxiliary component 14 is replaced with a new auxiliary component that places a different load on the engine or has a different shaft diameter than the auxiliary component 14. The front cover 18 may be removed (after the lubrication bath is drained from the housing 22), and the output power sprocket 70, or perhaps the output power subassembly 36, may then be replaced with a new output power sprocket (or a new output power subassembly) having a sufficient diameter to deliver the proper amount of power to the new auxiliary component and/or to receive the shaft of the new auxiliary component. The chain 28 may also be replaced with a new chain suitable for coupling the input power sprocket 30 and the new output power sprocket. In this manner, the modular PTO assembly 16 may be configured to provide power for a number of loads, thereby providing a user of the motor vehicle with the ability to more easily reconfigure and/or upgrade components of the motor vehicle.

Additionally, because the mounting rings 34 substantially centers the input power sprocket 30 in the first bore 20A and the third bore 18A and also serves as a fluid barrier (along with one of the seals 32), the amount of foreign particles in the lubrication bath, especially from engine components, is greatly reduced, thereby prolonging the service life of components within the housing 22. Inclusion of the mounting rings 34 in the power input subassembly 24 also increases engine line output during manufacturing, as the entire the modular PTO assembly 16 can be pre-assembled and brought to the assembly as one unit that can be quickly and efficiently mounted on an engine.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A modular power take-off assembly configured to be mounted and secured to a crankcase of an engine, the modular power take-off assembly comprising:
 a front cover and a base plate, wherein the front cover is positioned on the base plate so as to define a housing that is separated from the crankcase;
 a power input sprocket that is configured to be coupled to a nose of a crankshaft through a first bore through the housing and is configured to rotate at an approximately same speed as the crankshaft, wherein the power input sprocket comprises (i) a first hub that extends out from a first side of the power input socket and through the first bore and (ii) a second hub that extends out from a second side of the power input sprocket through a second bore in the housing;
 a first mounting ring positioned around the first hub so as to provide support for the first hub in the first bore;
 a second mounting ring positioned around the second hub so as to provide support for the second hub in the second bore, wherein the first mounting ring and the second mounting ring substantially center the power input sprocket in the first bore and in the second bore;
 a power output sprocket that is configured to be coupled to a shaft of an auxiliary component through a third bore through the housing and is configured to rotate at an approximately same speed as the shaft; and
 a chain that mechanically couples the power input sprocket to the power output sprocket, wherein the power input sprocket, the power output sprocket, and the chain are located inside the housing.

2. The modular power take-off assembly of claim 1, further comprising a shoulder bolt that passes through the a portion of the front cover and a portion of the base plate, wherein the shoulder bolt is configured to at least partially secure the modular power take-off assembly to the crankcase and is positioned so as to align the power input sprocket with the crankshaft when mounting the modular power take-off assembly to the crankcase.

3. The modular power take-off assembly of claim 1, further comprising a lubrication bath in the housing, wherein the lubrication bath comprising a lubricant through which at least a portion of the chain passes, wherein the first mounting ring further seals the housing so as to separate the lubrication bath from fluids in the crankcase.

4. The modular power take-off assembly of claim 1, wherein the first mounting ring and the second mounting ring are made at least in part of a low-friction polymer.

5. The modular power take-off assembly of claim 1, wherein the power input subassembly further comprises a timing sprocket, wherein the timing sprocket is coupled to the power input sprocket and is configured to be mounted on the nose of the crankshaft.

6. The modular power take-off assembly of claim 5, wherein the timing sprocket is coupled to the input power sprocket by one or more bolts.

7. The modular power take-off assembly of claim 5, wherein the power input sprocket is coupled to the timing sprocket via one of interference fitting or slip fitting.

8. The modular power take-off assembly of claim 1, further comprising:
 a lubrication bath in the housing, wherein the lubrication bath comprising a lubricant through which at least a portion of the chain passes; and
 at least one sensor configured to provide an output signal indicative of at least one of a temperature of the lubrication bath or a level of the lubrication bath.

9. The modular power take-off assembly of claim 1, wherein the modular power take-off assembly is configured to provide an output of at least 70 horsepower at approximately 3000 RPM of the shaft of the auxiliary component.

10. An engine system comprising:
 an engine comprising a crankcase, a crankshaft, and a timing sprocket, wherein the timing sprocket is mounted on a nose of the crankshaft, the nose of the crankshaft being at a forward end of the engine; and
 a modular power take-off assembly mounted to the forward end of the engine, the modular power take-off assembly comprising:
  a front cover and a base plate, wherein the front cover is positioned on the base plate so as to define a housing that is separated from the crankcase:
  a power input sprocket coupled to the timing sprocket through a first bore in the housing and configured to rotate at a substantially equivalent speed as the crankshaft, wherein the power input sprocket comprises (i) a first hub that extends out from a first side of the power input socket and through the first bore and (ii)

a second hub that extends out from a second side of the power input sprocket through a second bore in the housing;

a first mounting ring positioned around the first hub so as to provide support for the first hub in the first bore;

a second mounting ring positioned around the second hub so as to provide support for the second hub in the second bore, wherein the first mounting ring and the second mounting ring substantially center the power input sprocket in the first bore and in the second bore;

a power output sprocket configured to be coupled to shaft of an auxiliary component through a third bore through the housing and to rotate an approximately same speed as the shaft; and a chain that mechanically couples the power input sprocket to the power output sprocket, wherein the power input sprocket, the power output sprocket, and the chain are located inside the housing.

11. The engine system of claim 10, wherein a shoulder bolt passes through a portion of the front cover and a portion of the base plate and interfaces with threads in the crankcase, thereby at least partially securing the modular power take-off assembly to the crankcase and aligning the power input sprocket with the timing sprocket when coupling the power input sprocket to the timing sprocket.

12. The engine system of claim 10, wherein the first mounting ring and the second mounting ring are made at least in part of a low-friction polymer.

13. The engine system of claim 10, wherein the modular power take-off assembly further comprises a lubrication bath in the housing, wherein the lubrication bath comprises a lubricant through which at least a portion of the chain passes, wherein the first mounting ring further seals the housing so as to separate the lubrication bath from fluids in the crankcase.

14. The engine system of claim 10, wherein the modular power take-off assembly further comprises:

a lubrication bath in the housing, wherein the lubrication bath comprising a lubricant through which at least a portion of the chain passes; and at least one sensor configured to provide an output signal indicative of at least one of a temperature of the lubrication bath or a level of the lubrication bath.

15. The engine system of claim 10, wherein the modular power take-off assembly is configured to provide an output of at least 70 horsepower at approximately 3000 RPM of the shaft of the auxiliary component.

16. The engine system of claim 10, further comprising a hydraulic pump, wherein the hydraulic pump is the auxiliary component.

17. The engine system of claim 10, wherein the power input sprocket is coupled to the timing sprocket via one or more bolts.

18. The engine system of claim 10, wherein the power input sprocket is coupled to the timing sprocket via one of interference fitting or slip fitting.

* * * * *